United States Patent
Ash

[19]

[11] Patent Number: 5,773,115
[45] Date of Patent: Jun. 30, 1998

[54] FABRICATION OF MULTIPLE COLOR GAUGE AND TEXTURED INTERIOR AUTO COMPONENTS

[75] Inventor: Robert A. Ash, Baltimore, Canada

[73] Assignee: Davidson Textron Inc., Dover, N.H.

[21] Appl. No.: 956,201

[22] Filed: Oct. 22, 1997

Related U.S. Application Data

[62] Division of Ser. No. 641,551, May 1, 1996, Pat. No. 5,705,005.

[51] Int. Cl.[6] .................................................... B32B 3/14
[52] U.S. Cl. .................................... 428/57; 428/31
[58] Field of Search ............................ 428/57, 58, 61, 428/31

[56] References Cited

U.S. PATENT DOCUMENTS

| | | | |
|---|---|---|---|
| 4,562,025 | 12/1985 | Gray | 264/126 |
| 4,829,644 | 5/1989 | Kondo et al. | 264/46.8 |
| 4,833,741 | 5/1989 | Mizuno et al. | 264/46.6 |
| 4,861,543 | 8/1989 | Rafferty | 265/545 |
| 5,091,031 | 2/1992 | Strapazzini | 156/211 |
| 5,340,425 | 8/1994 | Strapazzini | 15/211 |
| 5,509,990 | 4/1996 | Masui et al. | 156/245 |
| 5,573,617 | 11/1996 | Franck et al. | 156/285 |

*Primary Examiner*—Alexander Thomas
*Attorney, Agent, or Firm*—Reising, Ethington, Learman & McCulloch

[57] ABSTRACT

An automotive trim panel is made by using an apparatus and method that bond together two trim coverstock segments having different colors, gauges or textures and two rigid substrate components into a single trim panel with the two coverstock segments meeting along a finished joint line. The method includes joining the coverstock segments together to form a rough seam, supporting the substrate components on two spaced-apart movable mold components with each substrate component having a mating flange that extends into the space between the mold components, applying an adhesive layer to the substrate upper surfaces, heating the joined coverstock segments and vacuum or positive air pressure-forming them across the substrate upper surfaces with the rough seam lying midway between the spaced-apart mold components. Pressure is then applied along the rough seam to infold the coverstock between the mold components while moving the mold components toward a clamped position that sandwiches the infolded coverstock portion between the substrate mating flanges and fastens them together with a pre-mounted fastener. The method forms a finished styling line between the dissimilar coverstock segments and hides the rough seam.

5 Claims, 2 Drawing Sheets

5,773,115

FABRICATION OF MULTIPLE COLOR GAUGE AND TEXTURED INTERIOR AUTO COMPONENTS

This is a division, of application Ser. No. 08/641,551 filed on May 1,1996 now U.S. Pat. No. 5,705,005.

TECHNICAL FIELD

This invention relates generally to automotive trim panels having multiple coverstock segments and a method and apparatus for forming automotive trim panels having multiple coverstock segments.

BACKGROUND OF THE INVENTION

It is known to thermoform coverstocks for composite plastic products such as PVC-covered, foamed urethane parts used to construct vehicle interior trim panels. It is also known to form multiple or "composite" coverstocks made from two or more coverstock segments, then bond the composite coverstock to a rigid substrate to form an automotive trim panel.

In the past, trim panels with composite coverstocks were made by layering coverstock segments on a base coverstock. The composite coverstock would then be formed and bonded to a rigid fiberglass or foam substrate in a separate step. Such layering of coverstock segments is labor-intensive and wastes the coverstock material that the added layers cover.

Another approach to providing composite coverstocks is set forth in U.S. Pat. No. 4,562,025 issued Dec. 31, 1985 and assigned to a common assignee. This patent discloses multiple coverstock segments formed by casting dry thermoplastic material against a heated mold. A divider separates two different colors of cast material as they are cast against the heated mold from a powder box. A fused joint is then formed between the two castings. While suitable for its intended purpose, such a method may require that some of the cast material be wasted in the process. Moreover, this process still requires that a separate step be performed if the composite coverstock is to be bonded to a rigid substrate.

It is also known to hand-wrap and sew coverstock segments into multiple or composite coverstocks. Although such a method conserves material, it is extremely labor-intensive.

It is also known to dielectrically bond the edges of multiple coverstocks to form a trim part cover. There is minimal waste using this method, but it requires a significant amount of labor and is difficult and impractical to use in forming coverstock for contoured parts such as contoured door panels for the interior of a vehicle.

When a trim panel includes more than one coverstock segment and the segments are made by joining two or more materials, e.g. polyvinylchloride (PVC), having different gauges or stiffnesses, it can be difficult to join the differing materials to form an aesthetically-pleasing styling line or seam between the segments. If, for example, one of two joined coverstock segments is cut from thicker or stiffer material than the other, the thicker or stiffer segment will have a larger bend radius and will be generally more bend-resistant at an infolded seam between the two segments. Differing bend radii can cause the seam to twist or curl-under unless steps are taken to permanently reinforce and stabilize the seam from behind. Similarly, if one coverstock segment is cut from stiffer material than the other, it will tend to unfold along the infolded seam causing the other segment to double over unless, as described above, the seam is permanently reinforced and stabilized from behind.

A properly reinforced pinched seam can also provide a fine styling line between coverstock segments cut from materials with different colors and surface textures. An extremely fine styling line between the segments can help mask the fact that two different segments have been joined together.

One method and apparatus for producing a fine styling line between segments while reducing material waste and labor requirements is set forth in U.S. Pat. No. 4,861,543 issued Aug. 29, 1989 and assigned to a common assignee. According to this method, the coverstock segments are joined together edge-to-edge forming a composite coverstock with slightly-overlapped rough seams. The composite coverstock is automatically heated and drape-formed on a thermoforming tool. The thermoforming tool automatically opens and applies a vacuum to infold the rough seams interiorly of the tool. The tool then pinches the infolded portions to form fine finished styling lines on the class A surface of the composite coverstock. The thermoforming tool has relatively movable mold parts that shape the composite coverstock and include an expandable joint configured to infold the rough seams. The method and apparatus produce a thermoformed composite coverstock with finished styling lines formed by pinched-off infolds on the hidden side of the composite coverstock. However, the coverstock is not bonded to a rigid substrate or foam backing to form a complete trim panel in the same operation. In addition, the method does not provide any means for permanently reinforcing and supporting the pinched seam after the composite coverstock is removed from the mold.

It is also known to combine coverstock segments to form an automotive trim panel by first bonding a first coverstock segment to a first substrate component in one operation, then bonding a second coverstock segment to a second substrate component in another operation. Finally, the two resulting coverstock-substrate sub-assemblies are bonded or mechanically fastened together in a third operation.

Prior arrangements, therefore, do not provide a trim panel with a finished, permanently-supported and stabilized styling line between coverstock segments of differing thickness or stiffness. Prior arrangements also do not provide a method or apparatus for joining two differing coverstock segments and two rigid substrate components together to form a trim panel in a single operation.

What is needed is an automotive trim panel comprising two differing coverstock segments bonded to two rigid substrate components and joined together at a pinched seam to form and permanently support a finished styling line where the two differing coverstock segments meet. What is also needed is a method and apparatus that joins two differing coverstock segments and two rigid substrate components together to form a single trim panel using less labor and fewer materials and without performing multiple operations.

SUMMARY OF THE INVENTION

This invention provides an automotive trim panel assembly that includes two differing coverstock segments and two rigid substrate components joined together to form a single trim panel and in such a way as to permanently support a finished styling line where the two differing coverstock segments meet, and a method and apparatus for manufacturing the trim panel assembly in a single operation.

The trim panel assembly includes two differing coverstock segments bonded to two rigid substrate components and joined together at a pinched seam to form and continuously support a finished styling line where the two differing coverstock segments meet—even where one segment has significantly heavier grain, gauge or backing. The two coverstock segments are joined together at a rough seam that joins the coverstock segments into a single composite coverstock. Each substrate has a mating flange that extends inward from along a portion of each substrate perimeter. The composite coverstock includes an infold formed along the rough seam. The infold projects inward and is permanently sandwiched between the substrate mating flanges forming a pinched junction that conceals the rough seam.

According to another aspect of the present invention a fastening element is disposed adjacent the coverstock infold and the substrate mating flanges. The fastening element binds the substrate mating flanges together while sandwiching the coverstock infold between the mating flanges and securing the pinched junction.

A trim panel manufactured according to the present invention is different from those shown in the prior art in that the rough seam between coverstock segments is folded inward and is permanently sandwiched between substrate mating flanges. The substrate mating flanges pinch the infolded portion to produce a pinched seam and a fine styling line. Because the mating flanges remain in this sandwiched disposition they continue to support the seam configuration after the completed trim panel is removed from the mold surfaces. In other words, the substrate mating flanges maintain the appearance of the finished styling line between coverstock segments—even when the coverstock segments have different textures, colors, compositions and thicknesses.

In accordance with this invention a method is provided for forming an automotive trim panel by bonding each of two automotive trim coverstock segments to one of two rigid substrate components and joining the resulting coverstock-substrate subassemblies together along substrate mating flanges such that the coverstock segments meet along a finished joint line. The method includes joining mating edges of the coverstock segments together to form a rough seam, supporting the substrate components on movable mold components with the substrate mating flanges engaging clamping surfaces of the mold components, locating the moveable mold components in a spaced-apart open position, vacuum or positive air pressure-forming and bonding the joined coverstock segments to upper surfaces of the substrate components with a portion of the joined coverstock segments spanning the space between the open mold components with the rough seam lying along the space approximately midway between the mold component clamping surfaces, applying pressure along the rough seam to fold the spanning coverstock portion inwardly between the spaced-apart mold component clamping surfaces while moving the mold component clamping surfaces together toward a clamped position. The mold component clamping surfaces cause the substrate mating flanges to sandwich the infolded coverstock portion thereby forming a finished styling line between the coverstock segments and hiding the rough seam.

According to another aspect of this method a vacuum is applied to the coverstock segments through the substrate components. The vacuum insures proper bonding between the coverstock segments and the substrate components.

According to another aspect of this method the substrate mating flanges are fastened together against the infolded coverstock portion with a fastener. The fastener fixes the substrate mating flanges in the sandwiched position on either side of the infolded coverstock portion and serve to permanently clamp and hold the pinched seam—maintaining the appearance of the finished styling line between the coverstock segments.

According to still another aspect of this method, the coverstock segments are heated prior to the step of supporting the coverstock segments over the upper surfaces of the substrate components, i.e., prior to vacuum or positive air pressure-forming the coverstock segments.

The method of the present invention is different from that disclosed in the prior art in that two coverstock segments and two rigid substrates with mating flanges are bonded together to form a fine styling line in a single operation. In addition, because the infolded portion of the joined coverstock segments remains sandwiched between the substrate mating flanges, there is no need to cut-off the rough seam or trim the infolded material after forming the pinched seam.

In accordance with this invention a mold assembly is provided for forming an automotive trim panel from two different coverstock segments and a two rigid substrate components, each coverstock segment having a mating edge pre-joined to a mating edge of the other coverstock segment to form a rough seam and each substrate component bent along one edge to form a mating flange. The assembly includes movable mold components having respective clamping surfaces. The mold components have an open position for receiving the substrate components. In the open position the clamping surfaces are separated for receiving and engaging the substrate mating flanges. The joined coverstock segments are draped over the substrate components with the rough seam extending along a portion of the joined coverstock segments spanning the space between the clamping surfaces. The mold components also have a clamped position for clamping the spanning portion of the joined coverstock segments between the substrate mating flanges. A forming-assist member is supported outwardly of and between the mold component clamping surfaces in the open position and is inwardly movable to provide inward pressure along the rough coverstock seam to cause the spanning coverstock portion to fold inward as the mold components move together toward the clamped position.

According to another aspect of the present invention, the mold components are adapted to allow a vacuum to be applied to the coverstock segments through the substrate components. Alternatively, the mold components may be adapted to allow air pressure to be applied above the coverstock. The vacuum or positive air pressure application causes the coverstock to form to the substrate components.

According to another aspect of the present invention, the mold components are adapted to support a fastener for fastening the substrate mating flanges together while sandwiching the infolded portion of the coverstock.

The apparatus of the present invention is different from that disclosed in the prior art in that the mold assembly includes a forming-assist member that provides inward pressure to help infold the rough seam between the coverstock segments as the two movable mold components close together into a clamped position to form the pinched seam.

BRIEF DESCRIPTION OF THE DRAWINGS

To better understand and appreciate the invention, refer to the following detailed description in connection with the accompanying drawings.

DETAILED DESCRIPTION OF THE PREFERRED EMBODIMENT

Figure 1:
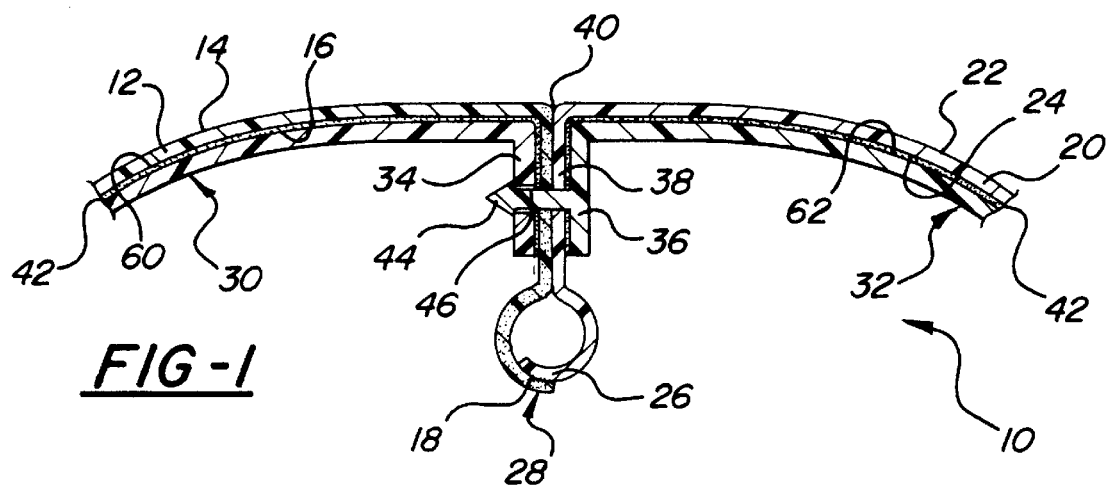
FIG. 1 is a fragmentary cross-sectional side view of a trim panel constructed according to the present invention.
Figure 2:
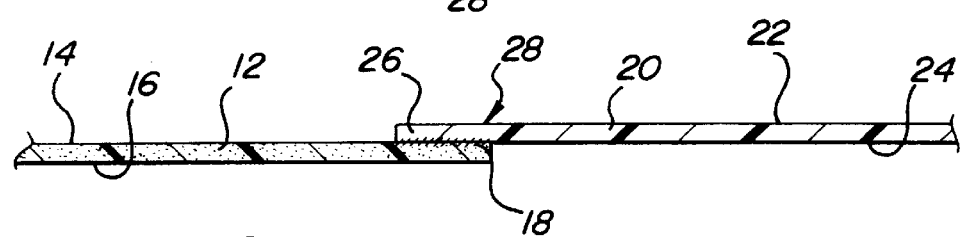
FIG. 2 is a fragmentary cross-sectional side view of two joined coverstock sections prior to assembly into the trim panel of FIG. 1.

An automotive trim panel assembly is generally shown at 10 in FIG. 1. The trim panel assembly 10 includes a first vinyl coverstock segment 12 having an outer class A surface 14 and a hidden inner surface 16. A mating edge 18 is disposed along a portion of a perimeter of the coverstock bounding both the outer surface 14 and the inner surface 16.

Figure 4:
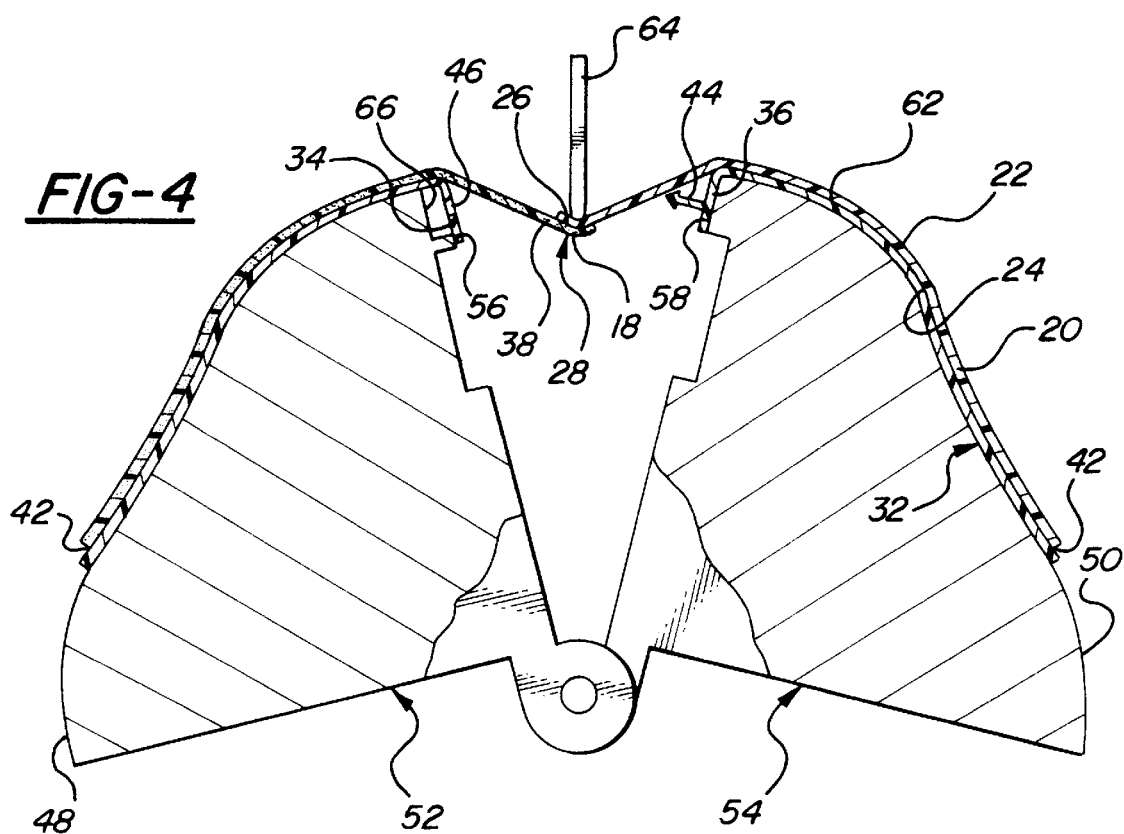
FIG. 4 is a cross-sectional side view of the coverstock sections of FIG. 2 and the substrate components of FIG. 3 mounted on a pair of mold components during assembly into the trim panel of FIG. 1.
Figure 5:
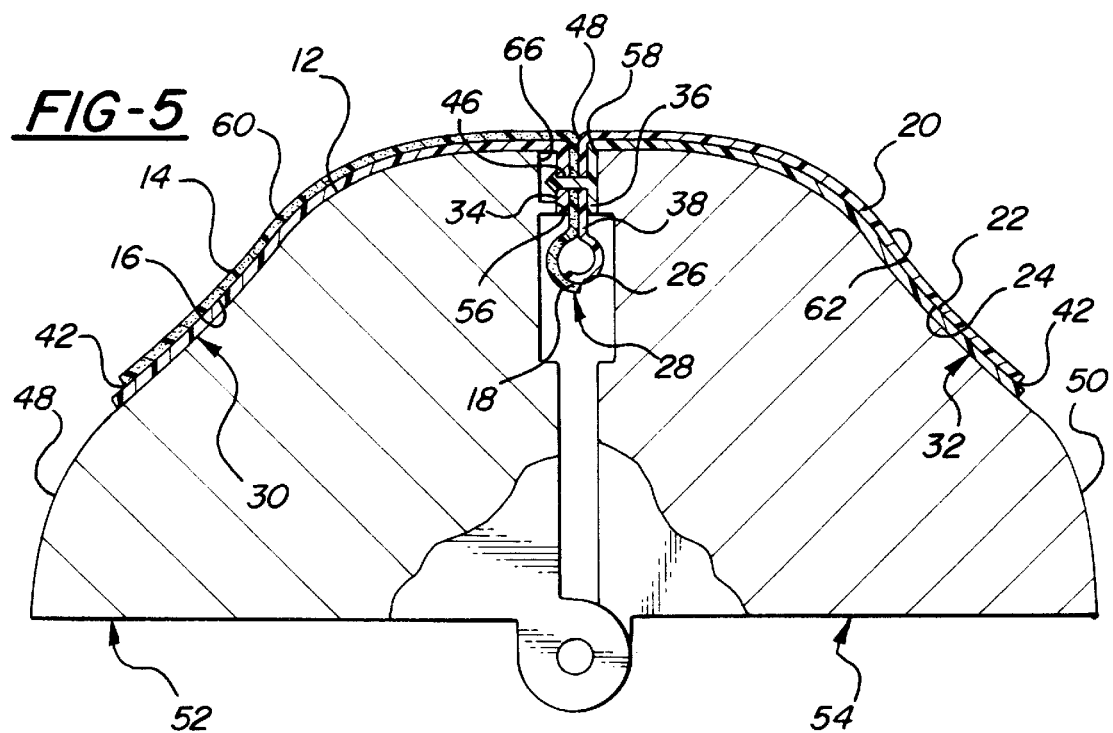
FIG. 5 is a cross-sectional side view of the coverstock sections of FIG. 2 and the substrate components of FIG. 3 mounted on the mold components of FIG. 4 following assembly into the trim panel of FIG. 1.

The assembly 10 also includes a second vinyl coverstock segment 20 with an outer surface 22, an inner surface 24 and a mating edge 26 disposed along a portion of a common perimeter bounding the outer surface 22 and the inner surface 24. The second coverstock segment 20 is bonded to the first coverstock segment 12 along the respective mating edges 18, 26 forming a rough seam, generally indicated at 28 in FIGS. 1, 2, 4 and 5. The rough seam 28 joins the coverstock segments 12, 20 into a single composite coverstock and the outer surfaces 14, 22 into a single composite outer surface. A first rigid substrate component, generally indicated at 30 in FIGS. 1 and 3–5, is bonded to the first coverstock inner surface 16. A second rigid substrate component, generally indicated at 32 in FIGS. 1 and 3–5, is bonded to the second coverstock inner surface 24. A mating flange 34, 36 extends inward from each respective substrate component 30, 32 at a ninety-degree angle from one peripheral edge of each substrate component 30, 32. The mating flanges 34, 36 are disposed parallel to one another. As is best shown in FIGS. 4 and 5, the composite coverstock 12, 20 includes a spanning portion 38 that is infolded along the rough seam 28 and projects inward between the parallel mating flanges 34, 36. As shown in FIG. 5, the infolded spanning portion 38 is sandwiched between the substrate mating flanges 34, 36 to form a pinched junction 40 at the composite coverstock outer surface 14, 22. The pinched junction 40 provides a finished precision styling line between the outer coverstock surfaces 14, 22 and conceals the rough seam 28.

As shown in FIGS. 1, 4 and 5, an adhesive layer 42 is included between the first substrate component 30 and the first coverstock segment 12 and between the second substrate component 32 and the second coverstock segment 20. The adhesive layer 42 may include any one or a combination of suitable adhesives as is well-known in the art.

Figure 3:
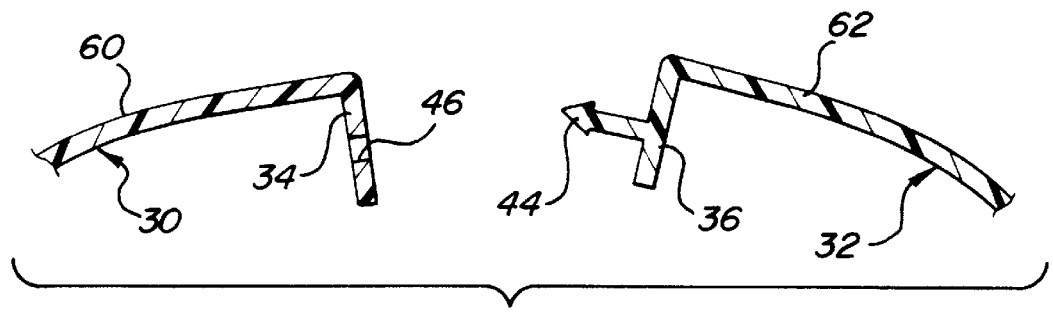
FIG. 3 is a fragmentary cross-sectional side view of two substrate components prior to assembly into the trim panel of FIG. 1.
Figure 3A:
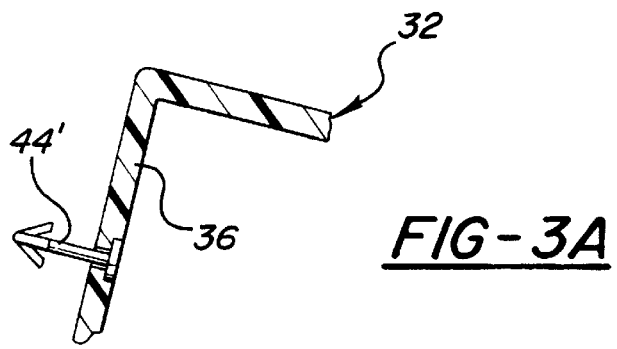
FIG. 3A is a fragmentary cross-sectional side view of a second embodiment of one of the substrate components of FIG. 3.

As shown in FIGS. 1 and 5, a fastening element 44 extends from one of the substrate mating flanges 36 and passes through the coverstock infolded spanning portion 38 into a fastener-receiving hole 46 in the other mating flange 34. The fastening element 44 binds the substrate mating flanges 34, 36 together while sandwiching the coverstock infolded spanning portion 38 between the mating flanges 34, 36 and permanently securing the pinched junction 40. Preferably, the fastener 44 comprises an injection-molded stud. In FIGS. 1 and 5, the fastener 44 is a stud having a base integrally connected to one of the substrate mating flanges 36, and a conical tip extending through the fastener-receiving hole 46 and engaging the other substrate mating flange 34. As shown in FIG. 3A, the fastener 44' may, alternatively, comprise a spring clip. The fastener may also be any one of a number of other mechanical connecting devices known in the art, e.g. clamps, rivets, staples, screws or injection-molded studs that are heat-staked or snap-fit into position.

In practice, the mating edges 18, 26 of the coverstock segments 12, 20 are first joined together to form the rough seam 28. Preferably the coverstock supplier accomplishes this and delivers a pre-joined composite coverstock 12, 20 for the trim piece manufacturer to assemble.

The adhesive layer 42 is then applied to outer surfaces 60, 62 of the substrate components 30, 32. As shown in FIG. 4, the first 30 and second 32 rigid substrate components are then mounted on outer shaping surfaces 48, 50 of respective first 52 and second 54 movable mold components with the mold components 52, 54 disposed in a spaced-apart "open" position. When the substrate components 30, 32 are mounted on the mold components 52, 54, the substrate mating flanges 34, 36 engage the mold components 52, 54 by extending downward and lying flush against respective mold component clamping surfaces 56, 58. This prevents the substrate components 30, 32 from sliding off the mold components 52, 54 and positions the substrate components 30, 32 for subsequent operations to be performed. In other embodiments, the adhesive layer 42 may be applied to the substrate outer surfaces 60, 62 after placing the substrate components 30, 32 on the mold.

The joined coverstock segments 12, 20 are then heated and draped over the adhesive-coated substrate outer surfaces 60, 62. The coverstock segments 12, 20 are heated to allow the coverstock segments 12, 20 to conform to the shape of the substrate outer surfaces 60, 62.

The portion 38 of the joined coverstock segments 12, 20 that spans the space between the open mold components 52, 54 is disposed so that the rough seam 28 lies along the space approximately midway between the mold component clamping surfaces 56, 58. Inward pressure is applied to the spanning coverstock portion 38 along the rough seam 28 as the mold components 52, 54 are moved to a clamped position shown in FIG. 5. The inward pressure folds the spanning coverstock portion 38 inwardly between the substrate component mounting flanges 34, 36. As the mounting flanges 34, 36 are moved together, the inward pressure stops and the substrate mating flanges 34, 36 are pressed together—sandwiching the infolded coverstock portion 38. By sandwiching the infolded coverstock portion 38 the two class A surfaces 14, 22 of the heated coverstock sections 12, 20 are forced together causing them to fuse. A finished styling line is formed between the class A surfaces 14, 22 of the coverstock segments 12, 20 at the point where the two class A surfaces 14, 22 are fused together. The finished styling line hides the rough seam 28 from view.

At the same time as the mold components 52, 54 are being moved together, a vacuum is applied to the coverstock segments 12, 20 through the substrate components 30, 32. The vacuum draws the joined coverstock segments 12, 20 inward against the substrate components 30, 32 improving coverstock adhesion to the substrate components 30, 32. Alternatively, positive air pressure may be applied to the upper surface of the coverstock segments 12, 20, forcing the coverstock segments 12, 20 to configure to the substrate. In other embodiments, a combination of vacuum pressure and positive air pressure may be employed.

With the mold components 52, 54 spaced apart, the fastener 44 is mounted or formed so that it protrudes from one of the mating flanges 36 at a point opposite the fastener-receiving hole 46 in the opposite mating flange 34. As the mold components 52, 54 move toward their clamped position, the fastener 44 is forced through the infolded coverstock portion 38 and into the fastener-receiving hole 46 in the opposite substrate mating flange 34. This secures the substrate mating flanges 34, 36 together in a position that sandwiches the infolded coverstock spanning portion 38 between them.

Following forming, clamping and fastening, the mold components 52, 54 are moved back toward the open position and the completed coverstock-substrate assembly 10 is removed.

An apparatus for practicing the method is representatively shown in FIGS. 4 and 5 as including a single thermoforming tool or shaping die which is operated to provide composite coverstocks with minimal material waste, shaped styling lines and hidden seams. The thermoforming tool or shaping die includes a mold assembly with an expandable joint. The expandable joint is defined by the movable mold components 52, 54 and clamping surfaces 56, 58 described above.

In their open position, the expandable joint is open and the mold components 52, 54 are separated. The mold components 52, 54 are moved to the open position so that the substrate components 30, 32 can be mounted with the substrate mating flanges 34, 36 extending between the open clamping surfaces 56, 58 of the mold components 52, 54. In other words, with the mold components 52, 54 in the open position, the clamping surfaces 56, 58 are spaced-apart allowing them to receive and engage the substrate mating flanges 34, 36 while the joined coverstock segments 12, 20 are bonded to outer surfaces of the substrate components.

In practice, the joined coverstock segments 12, 20 are laid across and drape-formed over the substrate components 30, 32 after the substrate components have been position on the mold components 52, 54. The composite coverstock 12, 20 is positioned over the mold components 52, 54 with the rough seam 28 extending lengthwise along the previously-described spanning portion 38 of the joined coverstock segments 12, 20. The mold components 52, 54 are adapted to allow a vacuum to be applied to the coverstock segments 12, 20 through the substrate components 30, 32. As described above, air pressure differential; i.e., the application of vacuum pressure, positive air pressure or both; helps to improve adhesion between coverstock segments 12, 20 and substrate segments 30, 32.

As shown in FIG. 4, a forming-assist member 64 is supported outwardly of and between the mold component clamping surfaces 56, 58 when the mold assembly is in the open position. The forming-assist member 64 is inwardly movable to provide inward pressure along the rough coverstock seam 28 as the mold components 52, 54 are moved together toward the clamped position. The forming-assist member 64 causes the spanning coverstock portion 38 to fold inward as the mold components 52, 54 move together toward the clamped position. The forming-assist member 64 is withdrawn before the mold components 52, 54 reach their clamped position where, as described above, the joined coverstock segments 12, 20 are sandwiched and clamped between the substrate mating flanges 34, 36.

The mold components 52, 54 are adapted to accommodate a fastener 44 for fastening the substrate mating flanges 34, 36 together while the mating flanges 34, 36 are sandwiching the infolded spanning portion 38 of the composite coverstock 12, 20. To allow a fastener 44, that is mounted in or integrally extending from one substrate mating flange 36, to pass through and engage the fastener-receiving hole 46 in the other substrate mating flange 34, one mold component clamping surface 56 is relieved in tool. In other words, one clamping surface 56 includes a recessed relief area 66 under the fastener-receiving hole 46. The relief area 66 prevents the clamping surface 56 from obstructing the passage of the fastener 44 through the fastener-receiving hole 46.

The composite coverstock 12, 20 may initially supported in a frame for heating and transport to the mold components 52, 54 for vacuum or positive-air pressure forming as described in U.S. Pat. No. 4,861,543, assigned to the assignee of the present invention and incorporated herein by reference. Following assembly, the finished trim panel 10 may be unloaded from the mold by any one of a number of methods known in the art to include the method described in U.S. Pat. No. 4,861,543 and incorporated by reference.

Producing trim panels according to the invention allows the use of two different coverstock grains on an automotive trim piece such as an instrument panel. For example, using a method according to the invention, trim panel manufacturers can use coverstock with heavier grain, gauge, or backing on the top deck of an instrument panel to improve reflective qualities and weatherability.

This invention also combines fused vinyl, adhesive and fasteners in such a way as to eliminate the need for heat staking. Moreover, it saves material in the area where the two coverstock segments join together by eliminating the need to include 4–5 inches of additional coverstock material, or "runoff". The additional runoff material is required when the first coverstock segment 12 and substrate component are formed separately from the second coverstock segment 20 and substrate component, then joined together in a later operation.

This is an illustrative description of the invention that uses words of description rather than of limitation. Obviously, it is possible to modify and vary this invention in light of the above teachings. Within the scope of the claims one may practice the invention other than as described. For example, various type of thermoforming may be used to include contact heat forming, pressure forming and air slip forming. The coverstock may be a polyvinyl chloride (PVC) material or may be one of a wide range of deformable sheet form or film materials both natural and synthetic. Rather than heating the vinyl coverstock material sufficiently to seal the pinched joint, a suitable dielectric heater may be used to complete the seal at the pinched joint. Various other changes in the apparatus configuration, product shape and methods could also be made to meet the design objectives of form, fit and function attendant to a particular coverstock for a particular composite product.

I claim:

1. An automotive trim panel assembly comprising:
   a first coverstock segment having an outer surface and an inner surface and a mating edge disposed along a portion of a common perimeter of said outer surface and inner surface;
   a second coverstock segment having an outer surface and an inner surface and a mating edge disposed along a portion of a common perimeter bounding said outer surface and said inner surface, said second coverstock segment bonded to said first coverstock segment along said respective mating edges forming a rough seam that joins said coverstock segments into a composite coverstock and said outer surfaces into a single composite outer surface;

a first rigid substrate component bonded to said first coverstock inner surface;

a second rigid substrate component bonded to said second coverstock inner surface;

each said substrate component including a perimeter with a mating flange extending inward from along a portion of each said substrate perimeter; and said composite coverstock including an infold formed along said rough seam and projecting inward and sandwiched between said substrate mating flanges forming a pinched junction at said composite outer surface and concealing said rough seam.

2. A trim panel assembly as defined in claim 1 further including a fastener having a first end connected to one of said substrate mating flanges and a second end connected to the other of said substrate mating flanges, said fastener connecting and holding said substrate mating flanges together in a parallel disposition on either side of said coverstock infold.

3. A trim panel assembly as defined in claim 2 wherein said fastener comprises a spring clip.

4. A trim panel assembly as defined in claim 1 wherein said mating flanges are disposed perpendicular to said composite coverstock outer surface.

5. A trim panel assembly as defined in claim 1 further including an adhesive layer disposed between said composite coverstock and said substrate components.

\* \* \* \* \*